United States Patent
Dankovich et al.

(10) Patent No.: US 7,484,243 B2
(45) Date of Patent: *Jan. 27, 2009

(54) HETEROGENOUS DOMAIN-BASED ROUTING MECHANISM FOR USER AUTHENTICATION

(75) Inventors: John Andrew Dankovich, Cedar Park, TX (US); Ann Thuan Ho, Round Rock, TX (US); Dah-Haur H. Lin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 698 days.

This patent is subject to a terminal disclaimer.

(21) Appl. No.: 10/675,670

(22) Filed: Sep. 30, 2003

(65) Prior Publication Data

US 2005/0071667 A1    Mar. 31, 2005

(51) Int. Cl.
*H04L 9/00* (2006.01)

(52) U.S. Cl. .............................. 726/8; 726/4

(58) Field of Classification Search .................. None
See application file for complete search history.

(56) References Cited

U.S. PATENT DOCUMENTS

| | | | | |
|---|---|---|---|---|
| 6,360,262 | B1* | 3/2002 | Guenthner et al. | 709/226 |
| 6,912,582 | B2* | 6/2005 | Guo et al. | 709/229 |
| 7,039,804 | B2* | 5/2006 | Fichtner et al. | 713/169 |
| 7,047,560 | B2* | 5/2006 | Fishman et al. | 726/6 |
| 7,146,637 | B2* | 12/2006 | Ault et al. | 726/8 |

FOREIGN PATENT DOCUMENTS

CN    1403952 A    3/2003

* cited by examiner

*Primary Examiner*—Pramila Parthasarathy
(74) *Attorney, Agent, or Firm*—Duke W. Yee; Justin M. Dillon; Wayne P. Bailey

(57) ABSTRACT

A routing routine is used within a security access program in order to provide access to various heterogeneous directories and registries. Each user logs on with an indication of the domain of which they are a part. An access protocol for the given domain is loaded and used to authenticate the user's access rights.

6 Claims, 4 Drawing Sheets

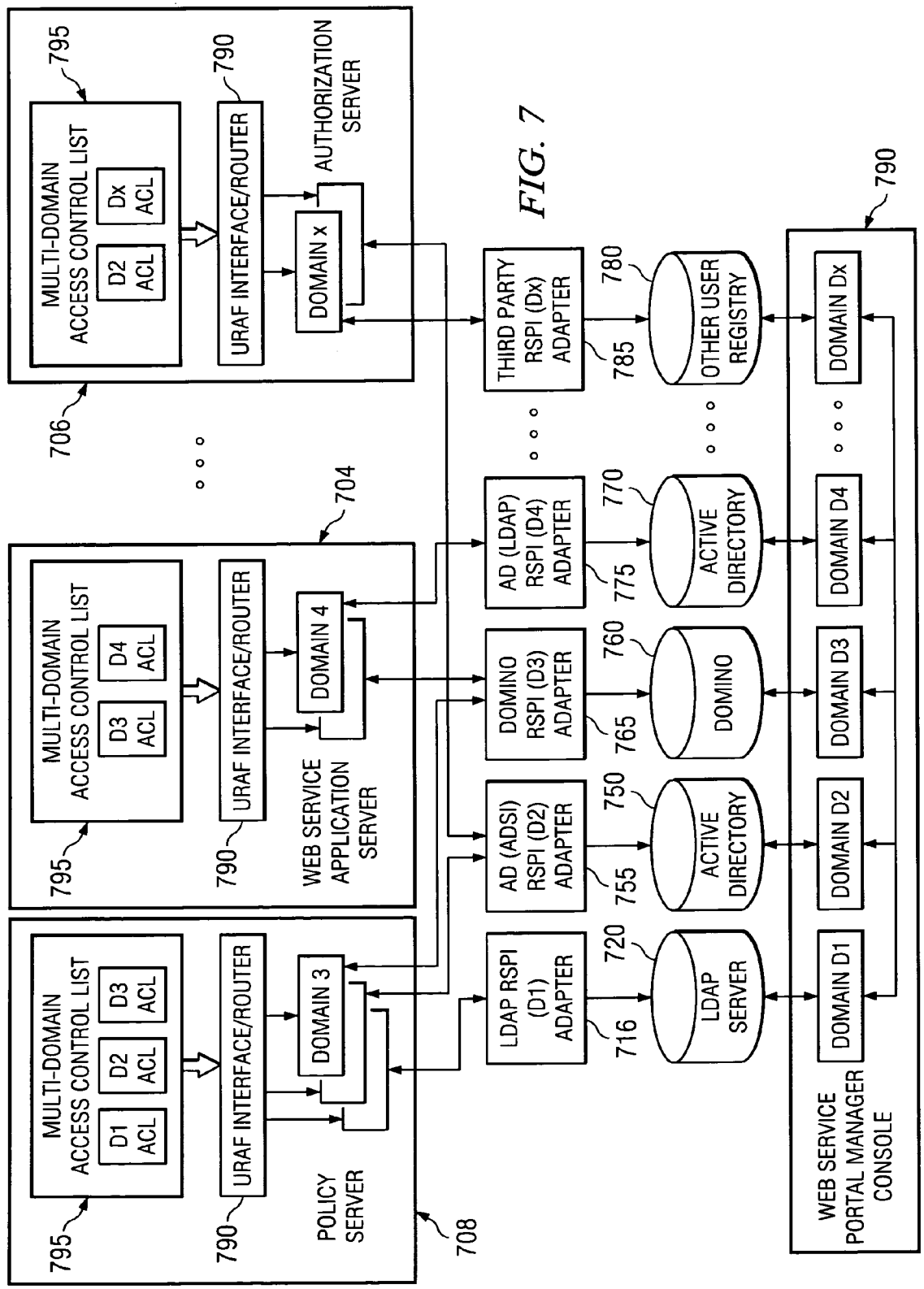

HETEROGENOUS DOMAIN-BASED ROUTING MECHANISM FOR USER AUTHENTICATION

BACKGROUND OF THE INVENTION

1. Technical Field

The present invention relates to security access systems. More specifically, this invention relates to providing security for multiple heterogeneous domains from a single source.

2. Description of Related Art

As e-business becomes an ever more necessary part of the business world, managing the available information in a secure manner becomes both a high priority and a source of potential problems. An example can highlight some of these problems.

Alpha Corporation is a large business that has been in operation for many years and prides itself on being at the forefront of information management. Alpha Corporation utilizes a security application, which was configured to a user registry, to maintain the security of a set of network resources in the corporation, such as applications, files, printers, and people. The application that works with the user registry provides a consistent way to describe, manage, and maintain information about these resources in a secure manner. Because of this security application, Alpha Corporation can be sure that access to sensitive information, whether it is technical information about developing products or personnel records, are handled appropriately. Alpha Corporation has been very happy with their security application, but they recently acquired the small Beta Company, then a few months later they merged with Gamma Corporation in order to gain a better position in the market. Beta Company runs a security program that also uses a user registry to control access—but it is not the same configuration structure as Alpha Corporation uses. Even worse, the security system used by Gamma Corporation is configured on a different kind of user registry. Alpha Corporation faces the problem of how to support user authentication of all three companies without having to migrate or duplicate massive amounts of data into a single user registry.

FIG. 1 schematically shows the original concept of an application program to handle access to resources within a domain 100. In this concept, each company, e.g., Alpha Corporation, had within its domain, or area of control, a single user registry 102 that stored all the information for that company. In this application environment, the user registry 102 was tied to a number of servers, such as web service applications server 104, authorization Server 106, and other blade servers 108. All information that each server required to authenticate the user of the company was contained within this domain 100 and under its direct control. Each of the servers 104, 106, 108 dealt with a single access control list (ACL) 101 and the servers accessed the same user registry 102 all using URAF (user registry adapter framework) interfaces. No variability was expected or allowed.

FIG. 2 shows a most current existing implementation of an application program to manage access to resources within domain 200. In this implementation, the servers, such as the web service application servers 204, authorization server 206, and blade servers 208 each contain the single ACL 201 and are tied to one and only one user registry option 210. This user registry option 210 determines the loading of the registry adapter 255, 265, 275, or 285 that will be used by the servers 204, 206, 208 to communicate with a user registry 250, 260, 270, or 280. Each of these registry adapters 255, 265, 275, 285 is a communications module that is specifically written for a given type of registry. The registry adapter handles all inter-operations and data manipulation between the caller's request, the registry client, and the registry server. A server can be configured to work with any of the supported user registry, but it can be configured to work with only one registry. In the figure, this limitation is shown as a four-way switch, by which the user registry option 210 can be connected to any of four(or more) options, but is connected to only one per instance. For supported user registries, such as lightweight directory access protocol (LDAP) 270, Microsoft Active Directory 250, Domino 260, and other user registries 280, the registry operations in each server will invoke a User Registry Adapter Framework (URAF) interface 217, which will dynamically load the Registry Service Provider Interfaces (RSPI) adapter 255, 265, 275, 285 to interface to a given user registry. Thus, there has been more flexibility in how the server 204, 206, 208 is set up, but once the initial choices are made, there is no variability in handling different user registries. Alpha Corporation would still have a problem trying to manage new user registries.

It would be desirable to have a method of allowing a single server to interface to more than one user registry. This would allow Alpha Corporation to provide user authentication of the companies it acquires or those with which it merges.

SUMMARY OF THE INVENTION

An intelligent routing system is installed as a new layer between the security application servers and the individual user registries. A user at sign-on would then need to identify not only their user identification and password, but also the domain of which they were a part. The domain information is used to determine which registry adapter is used by that domain and to route the inquiries to the appropriate user registry in a manner transparent to the user.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
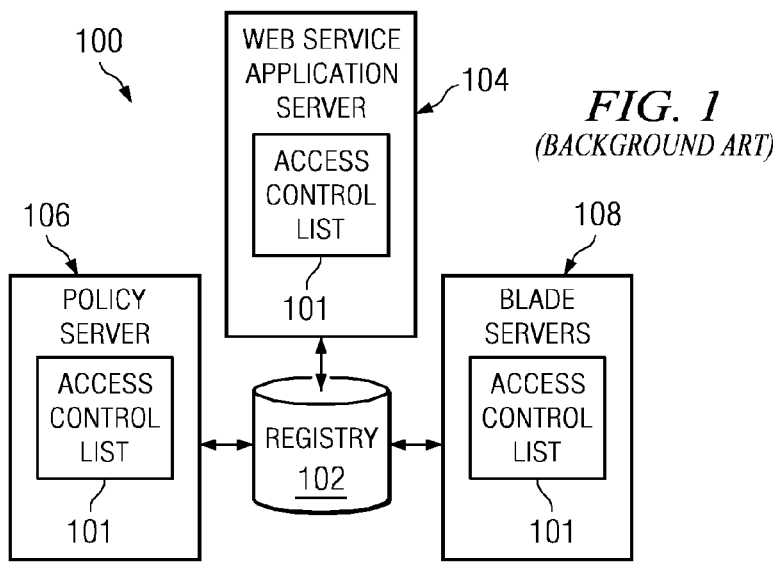
FIG. 1 is a schematic drawing of an early prior art security application system.
Figure 2:
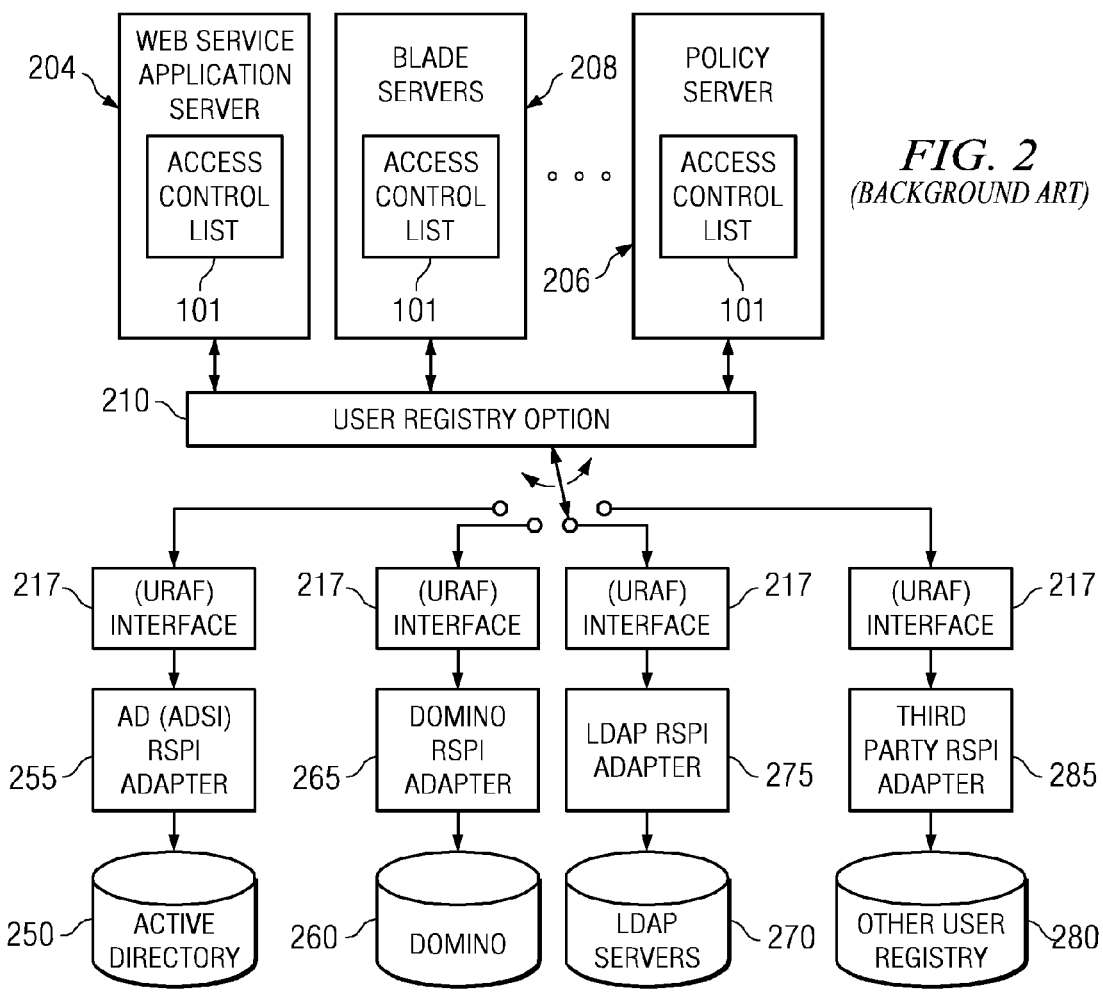
FIG. 2 is a schematic drawing of a later prior art security application system.
Figure 3:
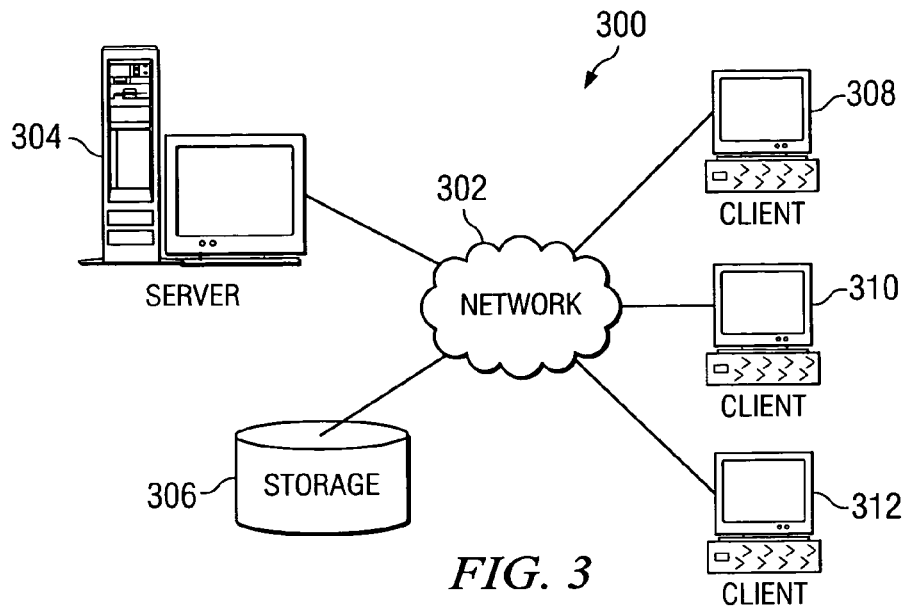
FIG. 3 depicts a pictorial representation of a network of data processing systems in which the present invention may be implemented.

With reference now to the figures, FIG. 3 depicts a pictorial representation of a network of data processing systems in which the present invention may be implemented. Network data processing system 300 is a network of computers in which the present invention may be implemented. Network data processing system 300 contains a network 302, which is the medium used to provide communications links between various devices and computers connected together within network data processing system 300. Network 302 may include connections, such as wire, wireless communication links, or fiber optic cables.

In the depicted example, server computer 304 is connected to network 302 along with storage unit 306. In addition, clients 308, 310, and 312 are connected to network 302. These clients 308, 310, and 312 may be, for example, personal computers or network computers.

In the depicted example, server computer 304 provides data, such as boot files, operating system images, and applications to clients 308-312. Clients 308, 310, and 312 are clients to server computer 304. Network data processing system 300 may include additional server computers, clients, and other devices not shown. In the depicted example, network data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 300 also may be implemented as a number of different types of networks, such as for example, an intranet, a local area network (LAN), or a wide area network (WAN). FIG. 3 is intended as an example, and not as an architectural limitation for the present invention.

Figure 4:
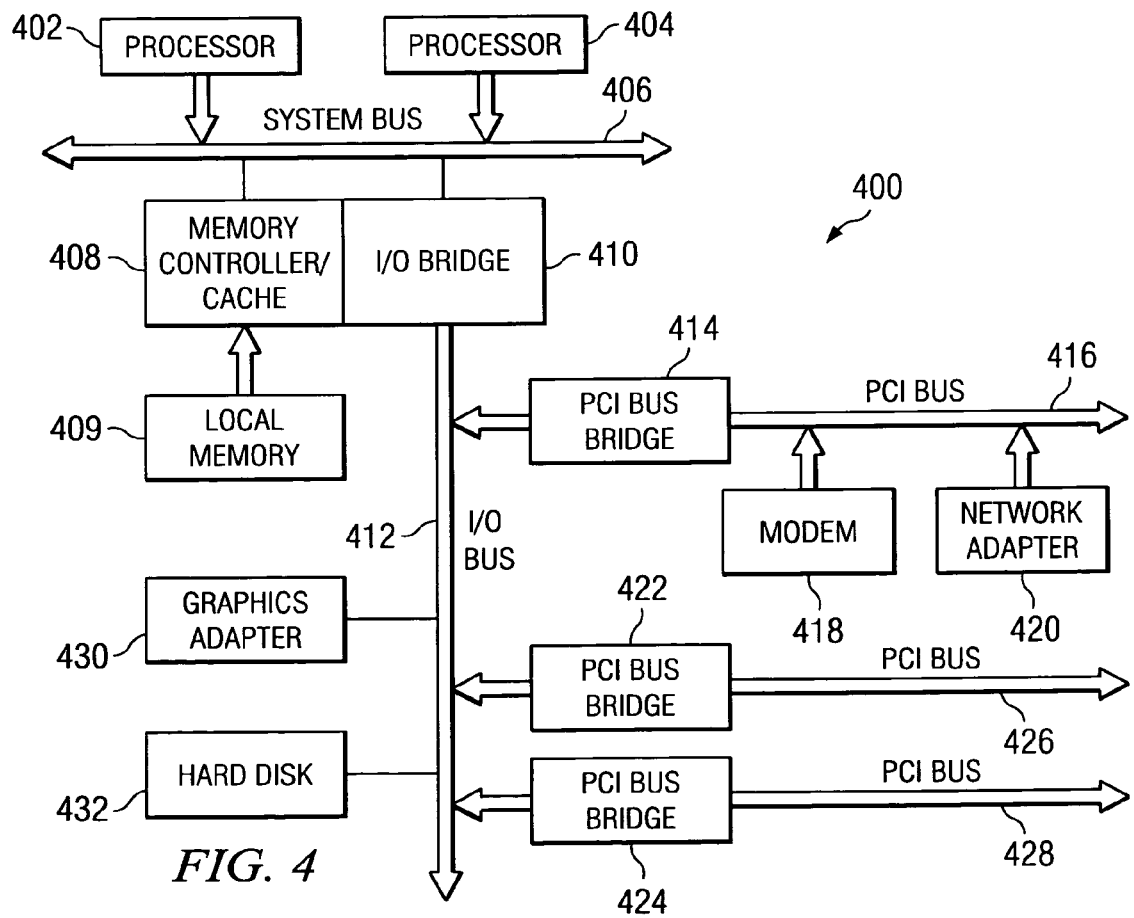
FIG. 4 depicts a server on which an embodiment of the invention can be implemented.

Referring to FIG. 4, a block diagram of a data processing system that may be implemented as a server computer, such as server computer 304 in FIG. 3, is depicted in accordance with a preferred embodiment of the present invention. Data processing system 400 may be a symmetric multiprocessor (SMP) system including a plurality of processors 402 and 404 connected to system bus 406. Alternatively, a single processor system may be employed. Also connected to system bus 406 is memory controller/cache 408, which provides an interface to local memory 409. I/O bus bridge 410 is connected to system bus 406 and provides an interface to I/O bus 412. Memory controller/cache 408 and I/O bus bridge 410 may be integrated as depicted.

Peripheral component interconnect (PCI) bus bridge 414 connected to I/O bus 412 provides an interface to PCI local bus 416. A number of modems may be connected to PCI local bus 416. Typical PCI bus implementations will support four PCI expansion slots or add-in connectors. Communications links to clients 308-312 in FIG. 3 may be provided through modem 418 and network adapter 420 connected to PCI local bus 416 through add-in boards.

Additional PCI bus bridges 422 and 424 provide interfaces for additional PCI local buses 426 and 428, from which additional modems or network adapters may be supported. In this manner, data processing system 400 allows connections to multiple network computers. A memory-mapped graphics adapter 430 and hard disk 432 may also be connected to I/O bus 412 as depicted, either directly or indirectly.

Those of ordinary skill in the art will appreciate that the hardware depicted in FIG. 4 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 4 may be, for example, an IBM eServer pSeries system, a product of International Business Machines Corporation in Armonk, N.Y., running the Advanced Interactive Executive (AIX) operating system or LINUX operating system.

Figure 5:
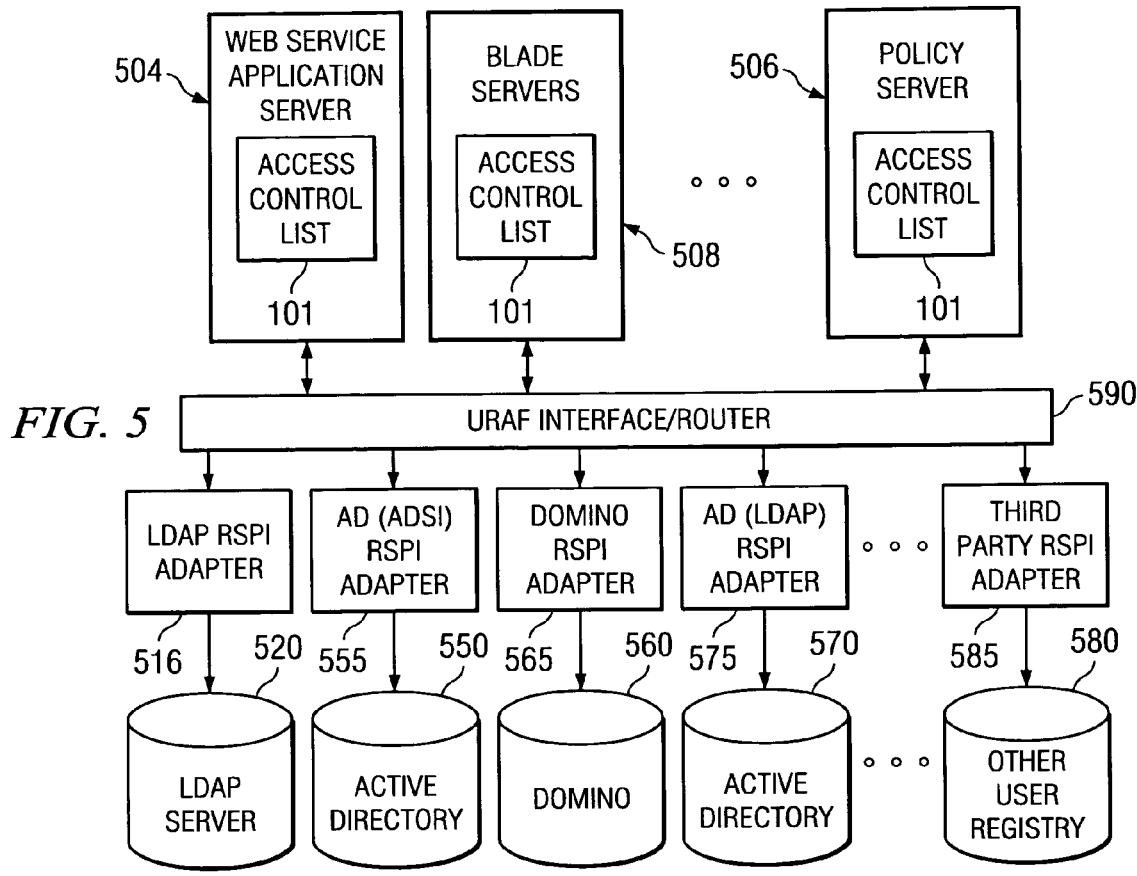
FIG. 5 schematically depicts a security application system according to an embodiment of the invention.

FIG. 5 is a schematic drawing of a security application system according to an embodiment of the invention. In this embodiment, the various servers, such as the web service application servers 504, authorization server 506, and blade server 508 all interface with the URAF interface containing an intelligent router 590. The intelligent router 590 has been facilitated to be able to interact with numerous different adapters and their associated user registries and to switch between these registries as necessary. In this embodiment, the URAF interface/router 590 interfaces with an LDAP server 520 through an LDAP RSPI adapter 516, with Microsoft's Active Directory 550 through Active Directory Service Interface 555, with Domino registry 560 through a Domino RSPI adapter 565, to another Active Directory 570 using an Active Directory LDAP RSPI Adapter 575, and with an unspecified user registry 580 using a third party RSPI adapter 585. The URAF interface/router 590 maintain a one-to-one mapping between each supported domain and its associated registry through each individual registry configuration in the 504, 506, and 508 server applications.

Figure 6:
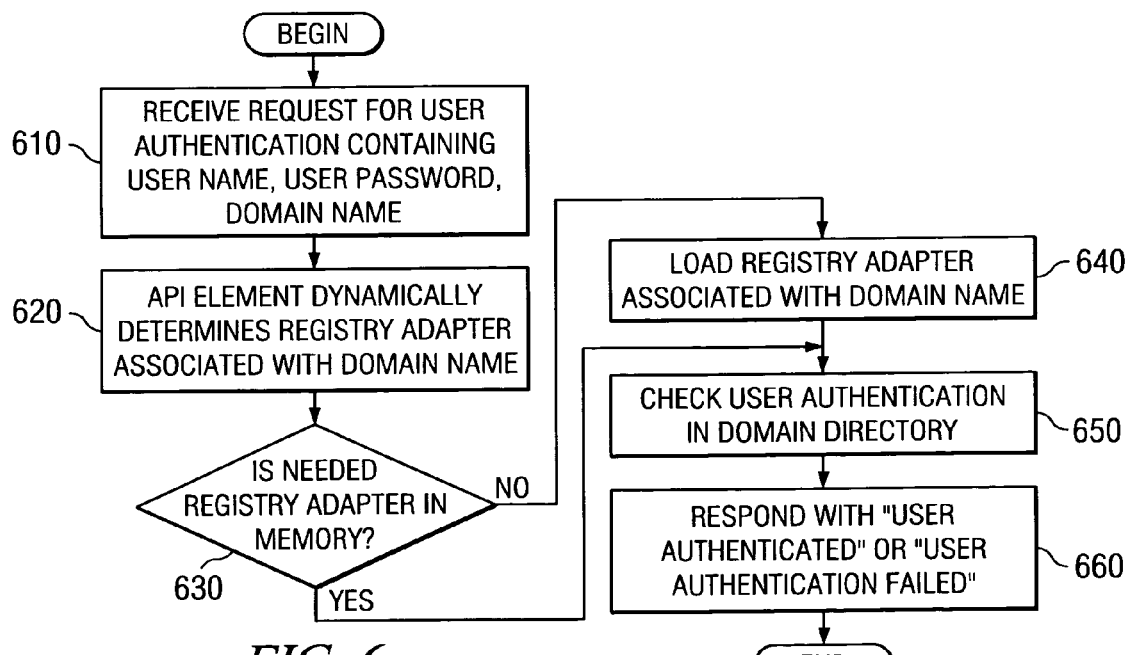
FIG. 6 depicts a flowchart of the method by which the security application system manages a request for authentication.

FIG. 6 shows a flowchart of the process by which the access system handles authentication for multiple domains. In step 610, the security application system receives a request to authenticate a user. This request contains the user name, user password, and domain name that were supplied at login. In step 620, the URAF application programmer interface (API) internally utilizes the user's domain name to locate (or map to) a specific registry adapter and dynamically routes the request to that registry adapter. It would be too wasteful of space to keep each of the various registry adapter in memory at all times, so step 630 checks to see if the needed registry adapter is in memory. If not, the URAF interface/router 590 loads that registry adapter into memory in step 640. Once the proper registry adapter is loaded, the URAF interface/router 590 acts as a bridge between the user and the adapter, passing the necessary information to the adapter using a simple mechanism. In the presently preferred embodiment, the information is passed using an interface entry-mapping table. The URAF interface/router then performs the user authentication against the associated user registry by forwarding the user name and user password to the registry server via the registry adapter in step 650. Notably, the registry adapter will handle all actions specific to the registry, including registry binding initialization, client invocation, and registry data manipulation. Depending on the results of the user authentication, the security application system can then respond in step 660 with a reply of either "user authenticated" or "user authentication failed".

With this new ability, Alpha Corporation will be able to accommodate not only their own resources, but also those of Beta Company and Gamma Corporation. The various registries used among Alpha, Beta, and Gamma can be maintained in their current formats, so no tedious data migration of resources is necessary. The merged corporation can maintain their security with little added effort.

For example, using the flowchart of FIG. 6, John Q. Doe, who works for Beta Company, has logged into his workstation, giving his user name as johnqdoe, his password as A2XQS38, and his domain as betaco. Although John works at Beta, the files for Alpha, Beta, and Gamma are maintained on the company server at Alpha Corporation. When John, in his capacity as personnel director, goes to access payroll files, his right to access these files must first be authenticated. His user name, password, and domain name are passed to the authorization server maintained at Alpha Corporation. The server will then pass this information to the intelligent router 590, which determines that the betaco domain is maintained on the Domino registry 560. The intelligent router 590 then loads the Domino RSPI Adapter 565 and checks for John Q. Doe's authorization to access these files. Since the registry contains that authorization, John is authenticated and can proceed with his work. Except for the need to enter an additional piece of information—his domain name—the process is invisible to John and the authentication is handled quickly.

It is possible, in an alternate embodiment of the invention, to not require the user to enter a domain name. This alternate embodiment, however, impacts response time, as the router will need to load and search successive directory access modules until either John Q. Doe is located or the possibilities are exhausted, in which case the authentication fails. Although, this alternative embodiment does provide convenience to the end user, who does not have to memorize the domain name that they belong to, if no domain name is entered, there can only be one johnqdoe in the system. If another John Q. Doe becomes a part of any of the domains controlled by Alpha Corporation, they will need to find a somewhat different user name. Alternatively, if a domain name is entered, as in the first example, there can be a different johnqdoe carried within each of the domains searched. All in all, the proper embodiment adopted in the registry's intelligent router implementation of a product is decided by the product's specific execution environment.

It can be noted as a further advantage of this innovation that the ability to access heterogeneous registries is a steppingstone to the eventual goal of providing security within a federation of separate domains that desire to provide mutual support and access to resources while relying on each domain within the federation to maintain the integrity of its own registry. Additionally, the support of federated user authentication in this invention provides the foundation to enhance the application's capability to handle cross-domain authorization operations. Such enhancement is very critical and essential particularly in a large enterprise environment where heterogeneous registries are individually associated with different sets of network resources and users. The cross-domain authorization support is achieved by making use of the cross-domain user credential that is created during the federated user authentication processes.

FIG. 7 demonstrates a possible version of such as system, which is supported by an embodiment of the inventive URAF interface/router 590 as disclosed herein. In this system, all of the servers 704, 706, 708 contain multi-domain access control lists 795 that delineate the domains D1, D2, D3, D4, Dx that can access the system through them. Each server uses its version of the inventive URAF interface/router 790, to load the correct adapter 716, 755, 765, 775, 785 and access a respective registry 720, 750, 760, 770, 780. Finally, a web service portal manager console 797 will allow the administrator to perform multiple domain administrative operations on the same console.

In an exemplary situation using the system shown in FIG. 7, John Q. Doe of Beta Company logs in at his office computer, using his username, password, and domain name as in the earlier examples. However, John has recently been involved in a joint development project with another company, Delta Corporation. Delta is a separate entity from the conglomerate that owns Alpha, Beta, and Gamma. They have agreed, however, that employees of either company who are working on the joint development project should be given access to any of the files relating to the project, regardless of whether those files are in the domain of Beta or Delta. John can now go to Delta Corporation's website and enter a secure portal to access Delta's files. Delta's web service applications 704 contain a multi-domain access control list 795 that lists the domain names for both Delta Corporation D3 and Beta Company D4. Although Delta does not control the domain D4 for Beta, John's request is routed by the URAF interface/router 790 to the registry 770 associated with the domain D4 for Beta. There, John is noted to be involved in the joint project and access is granted.

In this environment, the application can simply verify the cross-domain user credential with the access control data associated with the network resource to decide whether or not to allow the user to access to the resource. Thus, through federated user authentication, the cross-domain authorization enforcement is achieved without either changing any user registry set up, or migrating any data across multiple registries in the enterprise corporation.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMS, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for providing secure system access in a data processing system, said method comprising the steps of:

receiving, from a user, an authentication request comprising a user name associated with said user, a password associated with said user, and a domain name associated with said user;

using said domain name to select, by a single user registry adapter framework interface router that is operatively coupled to a plurality of heterogeneous servers, (i) an access protocol adapter that is associated with said domain name and (ii) an access registry that is associated with said domain name, wherein the access protocol adapter is selected from a plurality of heterogeneous access protocol adapters and loaded into a memory associated with the single user registry adapter framework interface router, and the access registry is selected from a plurality of access registries, wherein each of the access protocol adapters is a communication module that is tailored for a given one of the plurality of access registries in order to handle data manipulation of the authentication request to conform to the given one of the plurality of access registries, and wherein each one of the plurality of different access registries is used to authenticate users for a given respective domain of the data processing system;

routing access queries from said user to said access registry using said selected access protocol adapter; and authenticating said user using said selected access registry;

wherein the single user registry adapter framework interface router maintains a one-to-one mapping between each supported domain and associated registry for the supported domain.

2. The method of claim 1, further comprising the step of determining if said access protocol adapter that is associated with said domain name is in said memory.

3. The method of claim 2, further comprising the step of conditionally loading said access protocol adapter that is associated with said domain name if said access protocol adapter is not in said memory.

4. A method for providing secure system access in a data processing system, said method comprising the steps of:

providing a plurality of heterogeneous authentication registries, said plurality of authentication registries being accessed by a corresponding plurality of access protocol adapters; and routing authorization queries to a corresponding one of said plurality of access protocol adapters which accesses a corresponding one of said plurality of authentication registries to authenticate a user to access a resource of a system, wherein said routing step routes said authorization query to the corresponding one of said plurality of access protocol adapters according to a domain name specified by said user, and wherein each one of the plurality of authentication registries is used to authenticate users for a given respective domain of the data processing system, wherein each of the access protocol adapters is a communication module that is tailored for a given one of the plurality of access registries in order to handle data manipulation of the authentication request to conform to the given one of the plurality of access registries;

wherein the single user registry adapter framework interface router maintains a one-to-one mapping between each supported domain and associated registry for the supported domain.

5. The method of claim 4, further comprising the step of determining if said corresponding one of said plurality of access protocols is in memory.

6. The method of claim 5, further comprising the step of loading said corresponding one of said plurality of access protocols if said corresponding one of said plurality of access protocols is not in said memory.

* * * * *